(12) United States Patent
Numata

(10) Patent No.: US 12,472,603 B2
(45) Date of Patent: Nov. 18, 2025

(54) POWER TOOL

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 288 days.

(21) Appl. No.: 18/151,116

(22) Filed: Jan. 6, 2023

(65) Prior Publication Data

US 2023/0249314 A1    Aug. 10, 2023

(30) Foreign Application Priority Data

Feb. 8, 2022    (JP) .................................. 2022-018210

(51) Int. Cl.

| | |
|---|---|
| B24B 47/26 | (2006.01) |
| B24B 23/02 | (2006.01) |
| B24B 41/00 | (2006.01) |
| B24B 47/12 | (2006.01) |
| B24B 55/00 | (2006.01) |

(52) U.S. Cl.
CPC .............. *B24B 47/26* (2013.01); *B24B 23/02* (2013.01); *B24B 23/028* (2013.01); *B24B 41/00* (2013.01); *B24B 41/007* (2013.01); *B24B 47/12* (2013.01); *B24B 55/00* (2013.01)

(58) Field of Classification Search
CPC ....... B24B 23/028; B24B 23/02; B24B 55/00; B24B 47/26; B24B 47/12; B23Q 11/0092; B25F 5/001; F16D 51/42; F16D 49/18; F16D 65/10

USPC .................................. 451/344, 359; 188/186
See application file for complete search history.

(56) References Cited

U.S. PATENT DOCUMENTS

| | | | | |
|---|---|---|---|---|
| 2011/0220378 | A1* | 9/2011 | Numata | .................. B25F 5/001 |
| | | | | 173/141 |
| 2014/0069756 | A1* | 3/2014 | Esenwein | ............. B24B 23/028 |
| | | | | 188/323 |
| 2020/0189066 | A1* | 6/2020 | Qu | ...................... B23Q 11/0092 |
| 2020/0361057 | A1* | 11/2020 | Shibata | ................. B24B 41/007 |
| 2022/0118596 | A1* | 4/2022 | Hatakeyama | ............. B25F 5/02 |

FOREIGN PATENT DOCUMENTS

JP    6953252 B2    10/2021

* cited by examiner

*Primary Examiner* — Makena S Markman
(74) *Attorney, Agent, or Firm* — Oliff PLC

(57) ABSTRACT

Heat generated during braking is reduced to prevent reduction in braking performance or the service life of the components. A grinder includes a housing, an operable member, a switch operable to be turned on or off in response to an operation on the operable member, a rotational shaft rotatable in response to an operation for turning on the switch, and a brake assembly that applies braking to the rotational shaft with the switch being in an off state and to release the braking applied to the rotational shaft in response to an operation for turning on the switch performed by the operable member. The brake assembly includes a brake member being circular and fixed to the rotational shaft, and multiple pressing members that press the brake member at multiple positions to apply a uniform force to the brake member from radially outward positions toward a center of the brake member.

17 Claims, 17 Drawing Sheets

POWER TOOL

CROSS-REFERENCE TO RELATED APPLICATIONS

This application claims the benefit of priority to Japanese Patent Application No. 2022-018210, filed on Feb. 8, 2022, the entire contents of which are hereby incorporated by reference.

BACKGROUND

1. Technical Field

The present disclosure relates to a power tool such as a grinder that rotates a tip tool.

2. Description of the Background

Power tools such as grinders use a tip tool such as a grinding disc rotated to perform an operation. Such a power tool includes a brake assembly to stop inertial rotation of the tip tool in a short time when the operation is complete. An example brake assembly described in Japanese Patent No. 6953252 applies braking to an output shaft in a motor using a brake plate at the rear end of the output shaft. The brake plate is pressed by brake shoes, which are urged by coil springs. To use the tool, an operable member such as a paddle switch is pressed to turn on the tool. A lever then rotates in cooperation with the operable member to cause the brake shoes to be separate from the brake plate, releasing the braking. When the operable member is released from being pressed, the switch is turned off to cause the brake shoes to press the brake plate. This applies braking.

BRIEF SUMMARY

During braking, the brake shoes are in contact with the surfaces of the rotating brake plate, generating more heat in the brake assembly and possibly reducing braking performance or the service life of the components.

One or more aspects of the present disclosure are directed to a power tool that reduces heat generated during braking and prevents reduction in braking performance or the service life of the components.

A first aspect of the present disclosure provides a power tool, including:
  a housing;
  an operable member;
  a switch located in the housing and operable to be turned on or off in response to an operation on the operable member;
  a rotational shaft located in the housing and rotatable in response to an operation for turning on the switch; and
  a brake assembly located in the housing, the brake assembly being configured to apply braking to the rotational shaft with the switch being in an off state and to release the braking applied to the rotational shaft in response to an operation for turning on the switch performed by the operable member, the brake assembly including
    a brake member being circular and fixed to the rotational shaft, and
    a plurality of pressing members configured to press the brake member at a plurality of positions to apply a uniform force to the brake member from radially outward positions toward a center of the brake member.

The power tool according to the above aspect of the present disclosure reduces heat generated during braking and prevents reduction in braking performance or the service life of the components.

DETAILED DESCRIPTION

Embodiments

Embodiments of the present disclosure will now be described with reference to the drawings.

Figure 1:
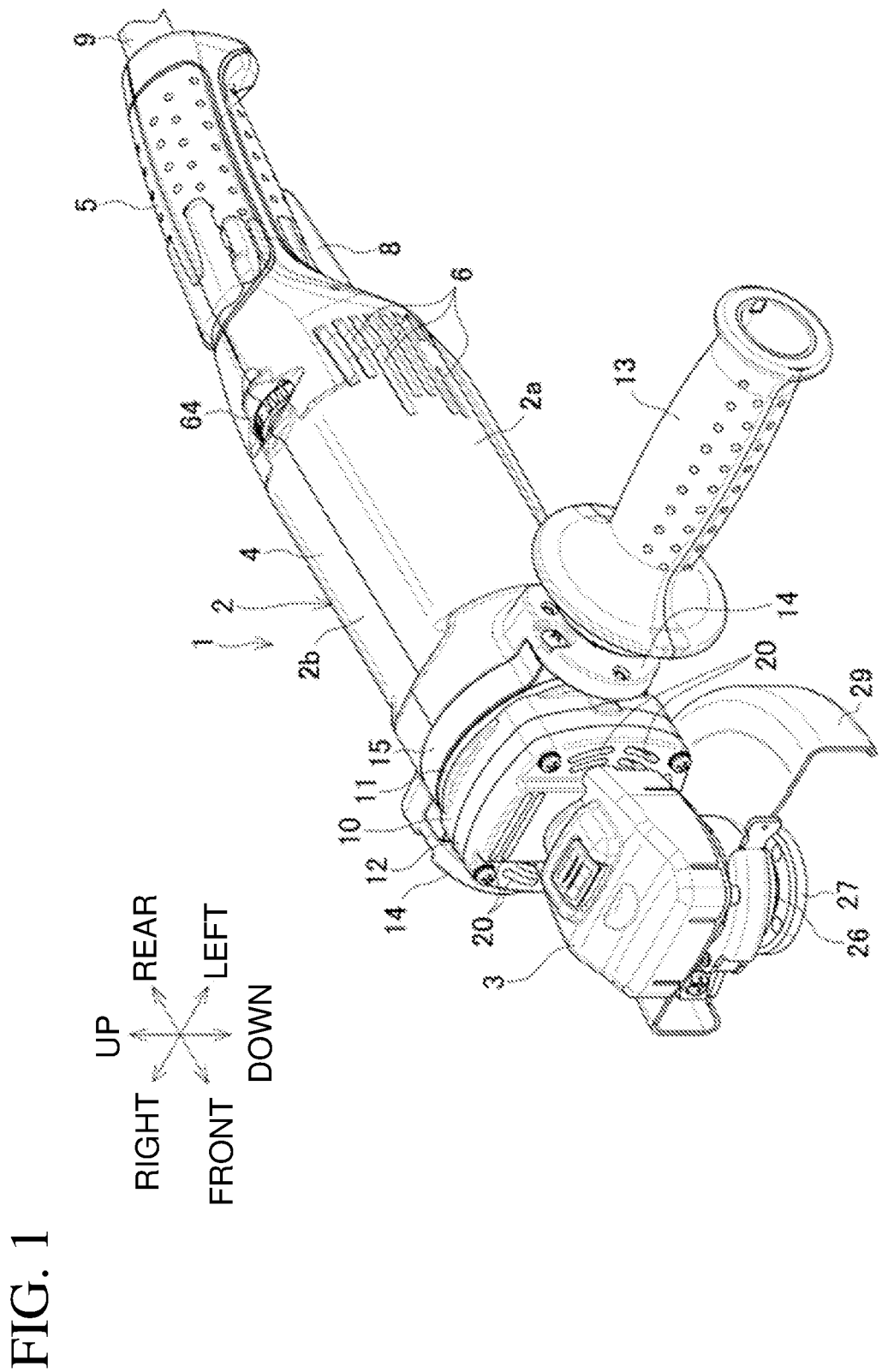
FIG. 1 is a perspective view of a grinder.
Figure 2:
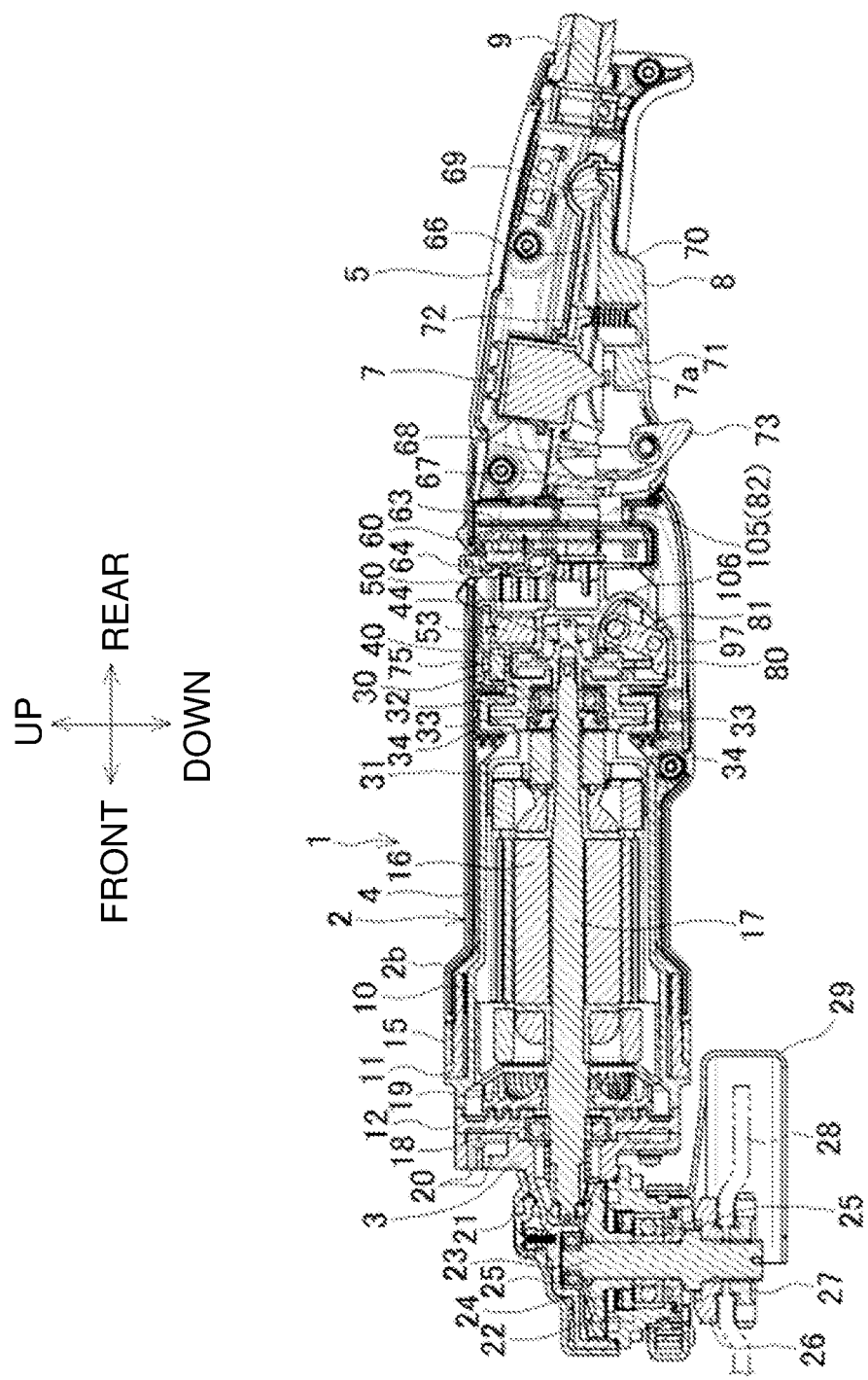
FIG. 2 is a longitudinal central sectional view of the grinder in a switch-off state.

FIG. 1 is a perspective view of a grinder as an example of a power tool. FIG. 2 is a longitudinal central sectional view of the grinder.

A grinder 1 includes a cylindrical main housing 2 extending in the front-rear direction. The main housing 2 is formed from resin. The main housing 2 receives a gear housing 3 formed from metal at its front. The main housing 2 includes a pair of left and right housing halves 2*a* and 2*b*. The housing halves 2*a* and 2*b* are fastened together with screws in the lateral direction. The main housing 2 includes a body 4 at the front and a grip 5 at the rear. The body 4 has multiple inlets 6 in its left and right rear side surfaces. The inlets 6 are elongated in the front-rear direction. The grip 5 has a smaller diameter than the body 4. The grip 5 obliquely extends downward from a position off and above the axis of the body 4 toward the rear. The grip 5 includes a switch 7 and a switch lever 8. A power cable 9 is connected to the rear end of the grip 5.

A motor housing 10 is held in a front portion of the body 4 with a rubber sleeve 11 in between. The gear housing 3 is fastened to the motor housing 10 with screws from the front with a gear housing cover 12 in between. Mounts 14 each for receiving a side handle 13 are located on the left and right of the body 4. A fixing ring 15 is located at the front of the main housing 2 and inward from the mounts 14. The fixing ring 15 is externally mounted on the rubber sleeve 11. The mounts 14 are fastened to the fixing ring 15 with screws.

The motor housing 10 is formed from resin. The motor housing 10 accommodates a motor 16 (commutator motor). The motor housing 10 accommodates the motor 16 with an output shaft 17 extending in the front-rear direction. The output shaft 17 includes its front portion protruding into the gear housing 3 through the gear housing cover 12. The gear housing cover 12 receives a bearing 18 for supporting the output shaft 17. Behind the gear housing cover 12, a fan 19 is fixed to the output shaft 17. The gear housing 3 has multiple outlets 20 in its front surface. Each outlet connects to the inside of the motor housing 10.

A bevel gear 21 is mounted at the front end of the output shaft 17 in the gear housing 3. The gear housing 3 receives a bearing box 22 attached to its lower portion. A spindle 23 is located in the gear housing 3 and the bearing box 22. The spindle 23 extends vertically. The spindle 23 receives a bevel gear 24 in its upper portion. The bevel gear 24 meshes with the bevel gear 21 on the output shaft 17. The spindle 23 is axially supported by upper and lower bearings 25. The upper bearing 25 is held in the gear housing 3. The lower bearing 25 is held in the bearing box 22. The spindle 23 has its lower end protruding downward from the bearing box 22. The lower end of the spindle 23 can receive a tip tool 28 (e.g., grinding disc) in a detachable manner with an inner flange 26 and a lock nut 27. A wheel cover 29 is attached to the bearing box 22. The wheel cover 29 covers an upper portion located rearward and a rear portion of the tip tool 28.

Figure 3:
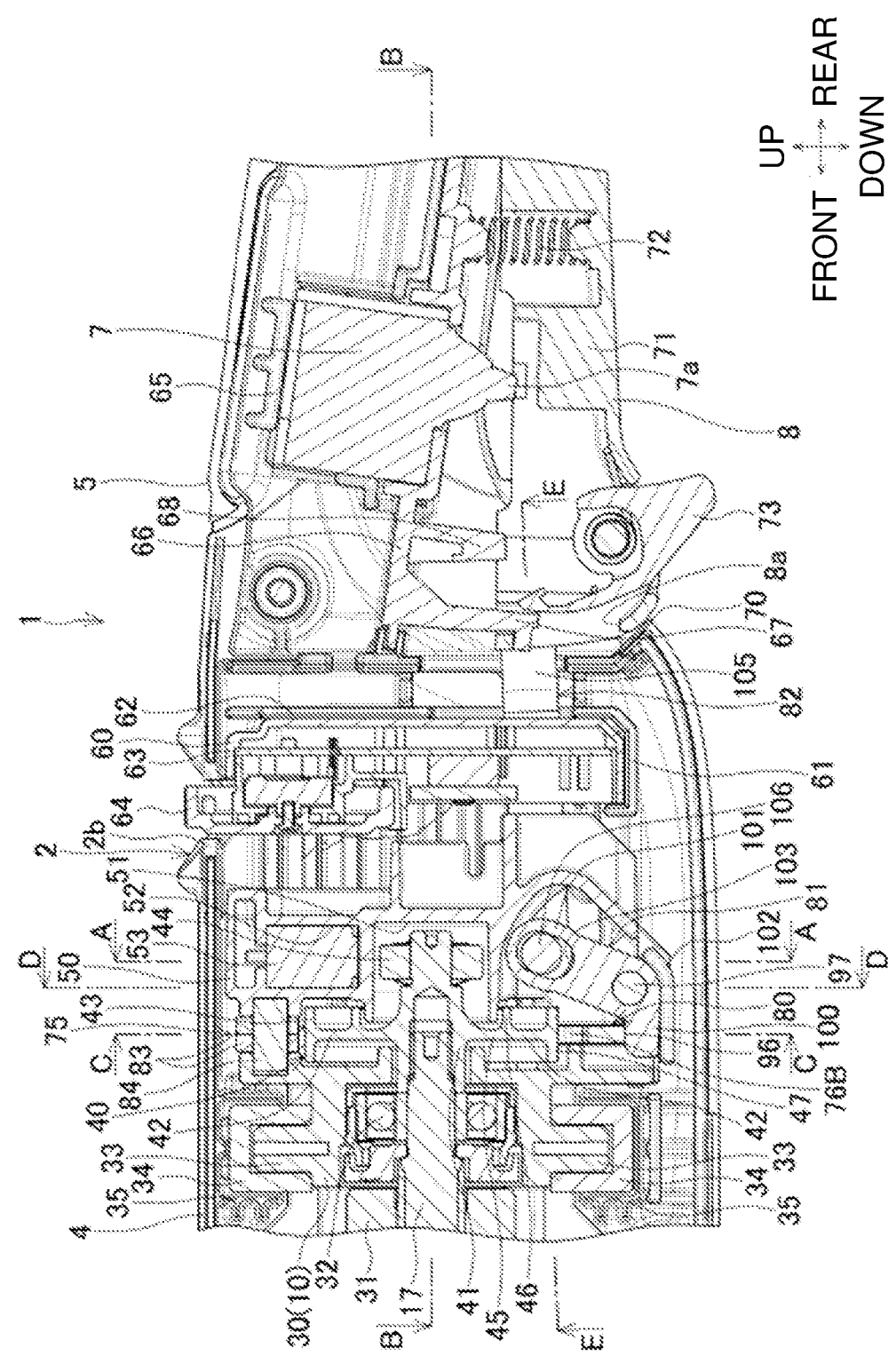
FIG. 3 is an enlarged view of a brake assembly in FIG. 2.
Figure 4:
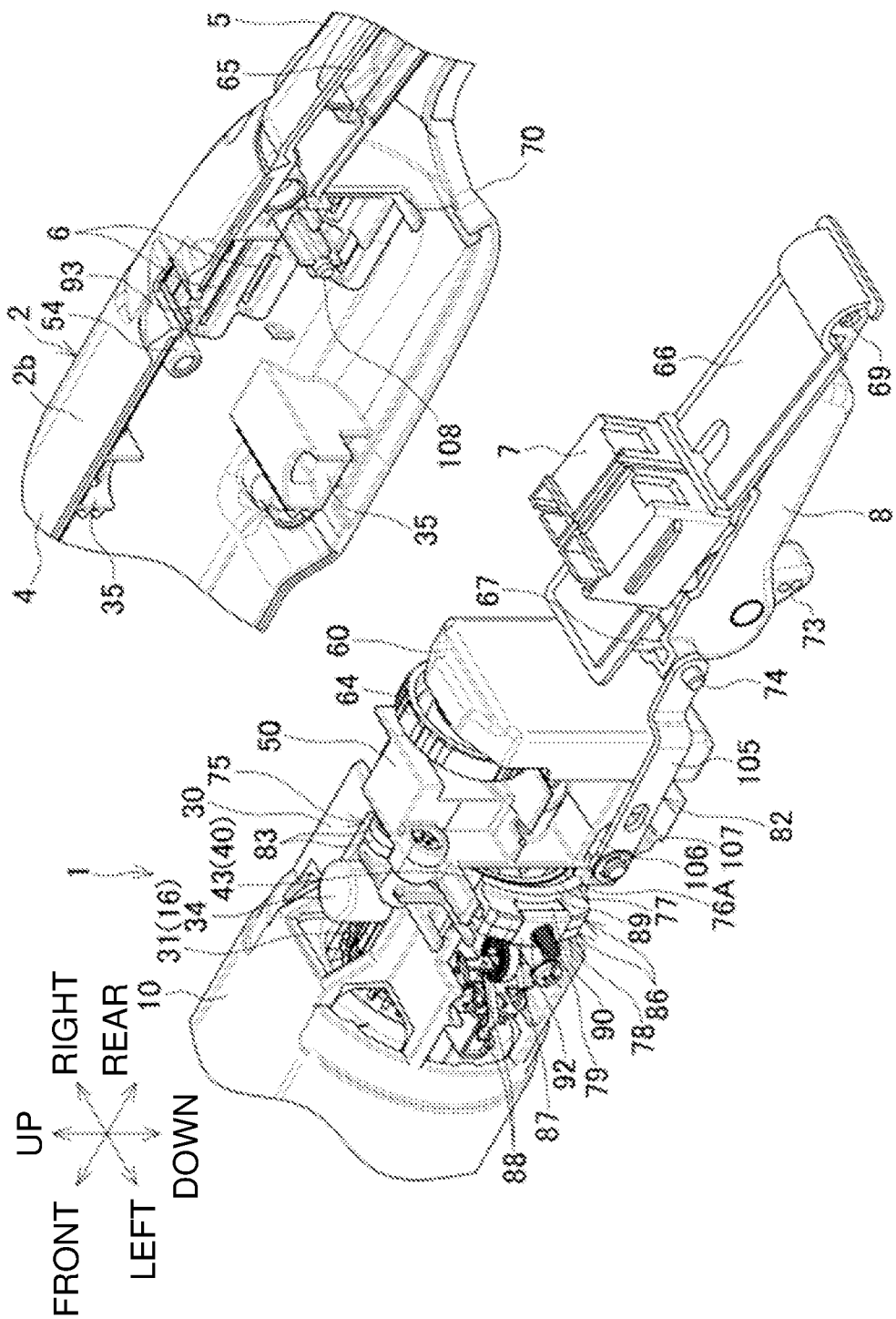
FIG. 4 is an exploded perspective view of the brake assembly and a right housing half as viewed from the rear.
Figure 5:
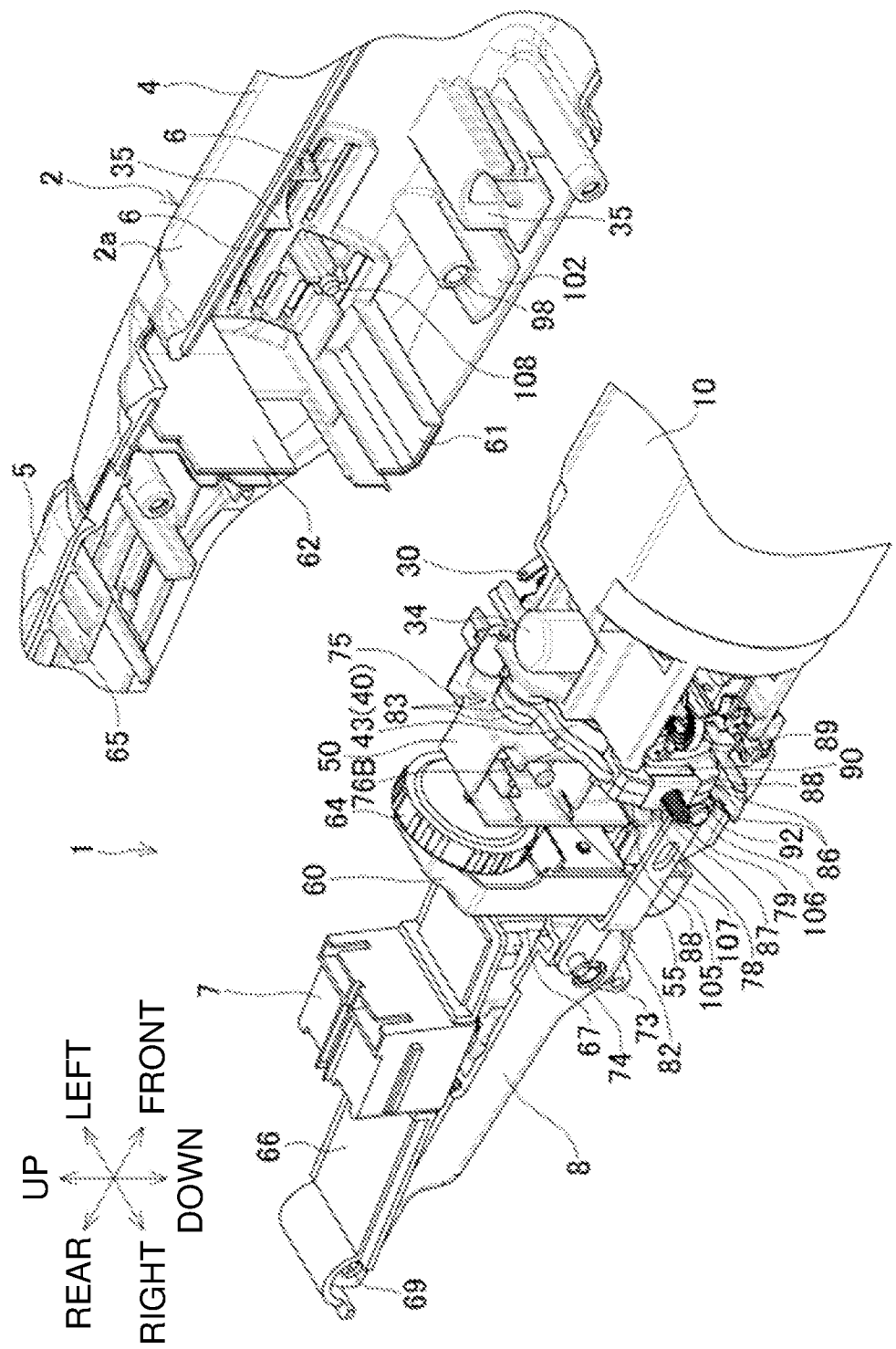
FIG. 5 is an exploded perspective view of the brake assembly and a left housing half as viewed from the front.

As shown in FIG. 3, a bearing retainer 30 is integral with a rear portion of the motor housing 10. The output shaft 17 protruding rearward from a commutator 31 is supported by a bearing 32. The bearing 32 is held in the bearing retainer 30. The bearing retainer 30 includes a pair of upper and lower support projections 33. The support projections 33 are coaxial in the vertical direction perpendicular to the axis of the output shaft 17. Each support projection 33 receives a rubber ring 34 as a cap. As shown in FIGS. 4 and 5, holders 35 are located on the upper and lower inner surfaces of the left and right housing halves 2a and 2b. Each holder 35 protrudes inward in the lateral direction to hold the upper or lower rubber ring 34 at the middle. Thus, the motor housing 10 is elastically supported in the main housing 2 with the rubber sleeve 11 at the front and the rubber rings 34 at the rear.

Figure 6:
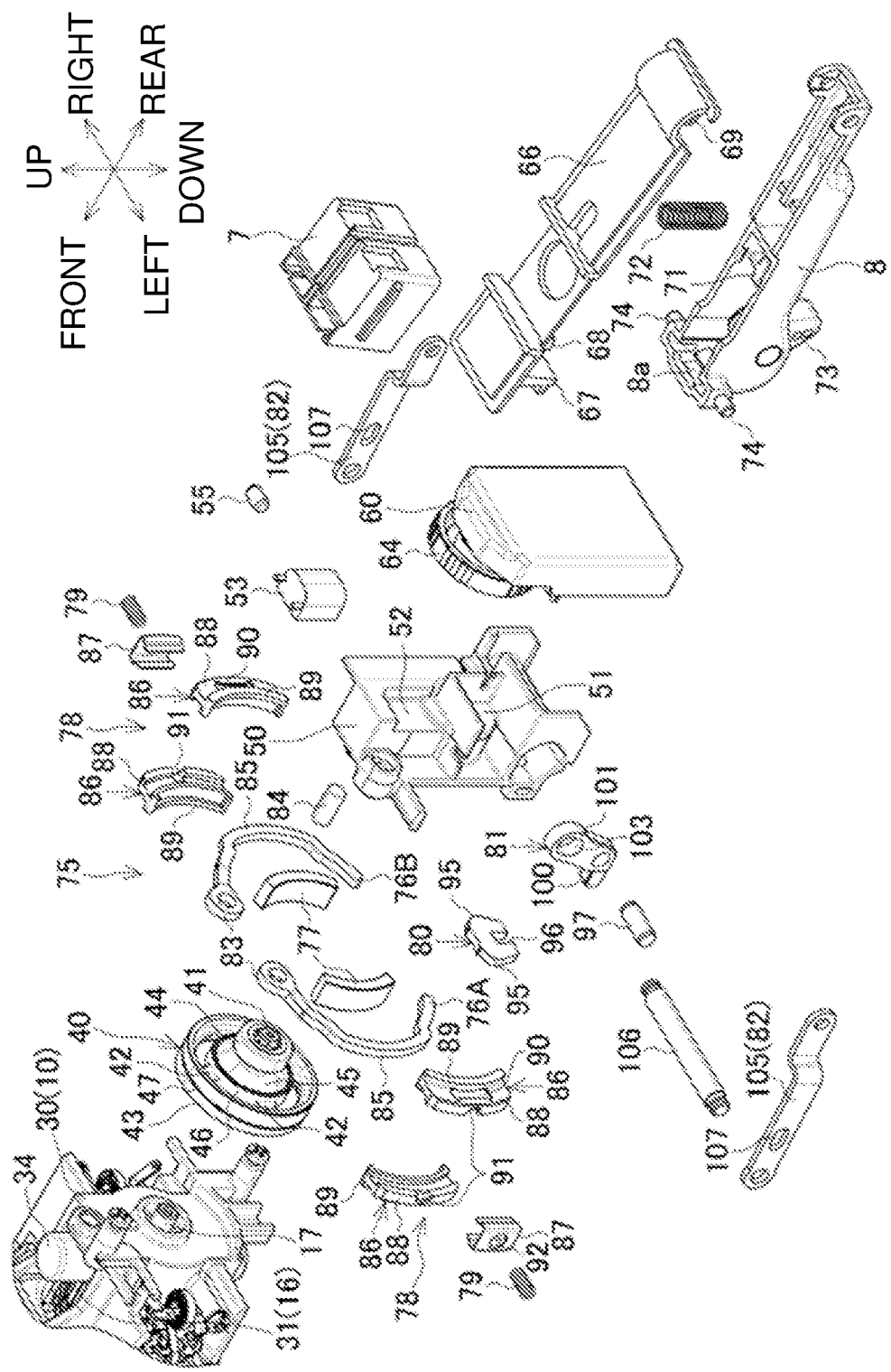
FIG. 6 is an exploded perspective view of the brake assembly.

The output shaft 17 has its rear end extending rearward through the bearing retainer 30. Behind the bearing retainer 30, a brake drum 40 is fixed to the rear end of the output shaft 17. The brake drum 40 includes a hub 41, multiple spokes 42, and a rim 43, as also shown in FIG. 6. The hub 41 is screwed onto the output shaft 17 from the rear and is coaxially and integrally connected to the output shaft 17. The hub 41 is tightened in a direction opposite to the rotation direction of the output shaft 17. The hub 41 receives a disk-shaped magnet sleeve 44 attached to its rear end. A disk 45 is mounted on the outer circumference of the hub 41. The disk 45 includes a circular rib 46 extending rearward on its outer circumference. The multiple spokes 42 extend radially from the outer circumferential surface of the circular rib 46. The spokes 42 each have an end connected to the rim 43. The rim 43 is located radially outward from the disk 45 and is coaxial with the disk 45. The rim 43 is a strip ring protruding frontward and rearward from the spokes 42. The rim 43 has a spiral groove 47 on its outer circumferential surface. The groove 47 has its front and rear ends connecting to the front and rear end faces of the rim 43 and open at the end faces.

Figure 7:
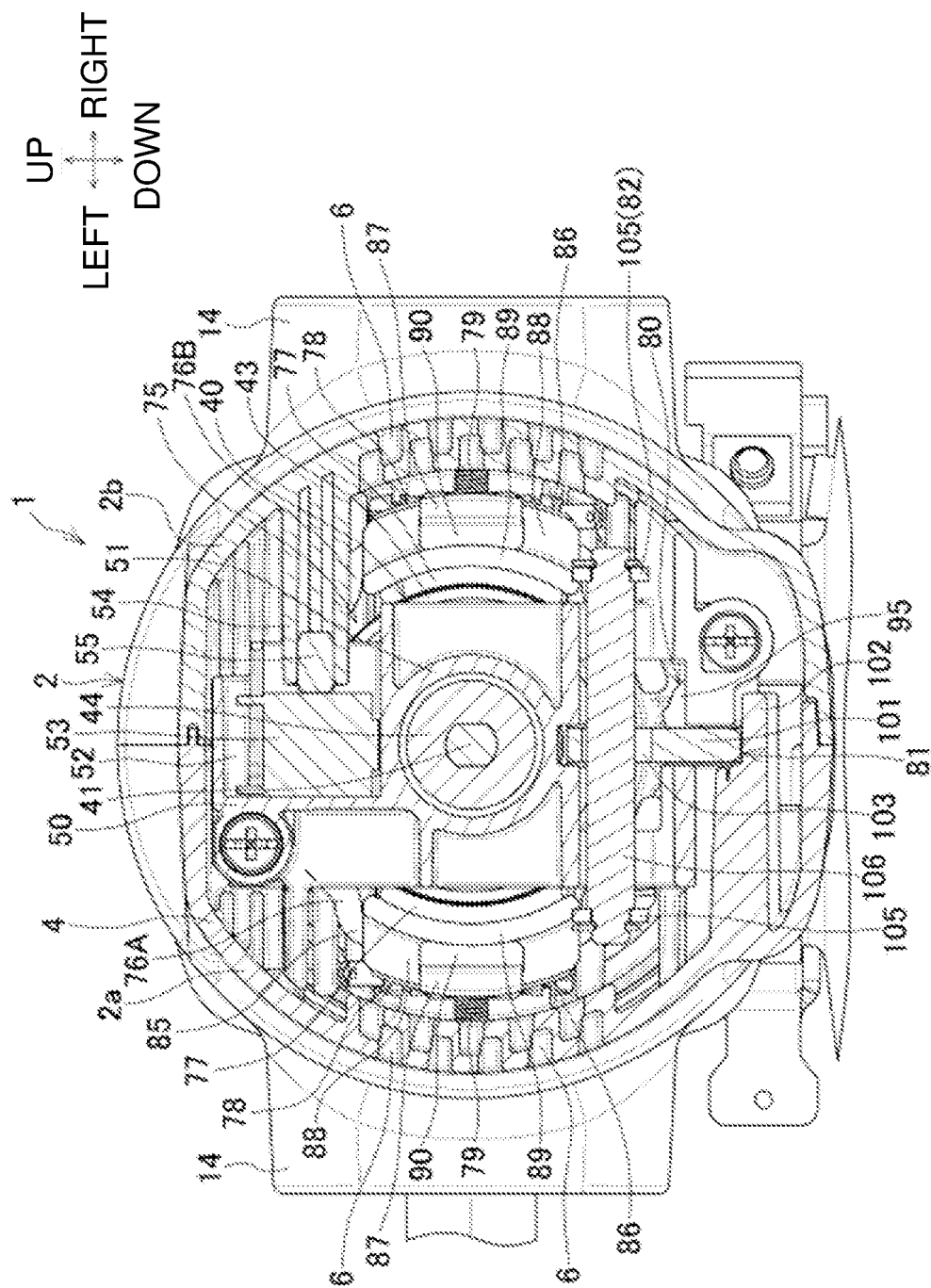
FIG. 7 is a sectional view taken along line A-A in FIG. 3.

A coil holder 50 is located behind the brake drum 40 in the body 4. The coil holder 50 is a rectangular box extending in the vertical direction as also shown in FIG. 7. The coil holder 50 is fastened to the bearing retainer 30 with screws from the rear at two diagonal positions. The coil holder 50 has a circular recess 51 that is open frontward at the center. The circular recess 51 accommodates the rear end of the hub 41 in the brake drum 40 and the magnet sleeve 44 without contact with one another. The circular recess 51 has its front end protruding inside the circular rib 46 on the hub 41. The front end of the circular recess 51 overlaps the circular rib 46 without contact with each other in the radial direction.

The coil holder 50 includes a compartment 52 for a pickup coil 53 above the circular recess 51. The compartment 52 accommodates the pickup coil 53 with a sensing surface facing downward. The sensing surface of the pickup coil 53 is located directly above the magnet sleeve 44. The right housing half 2b includes a boss 54 on its inner surface. The boss 54 protrudes leftward. The boss 54 holds a rubber pin 55 at its distal end. The rubber pin 55 is in contact with the right side surface of the pickup coil 53 to press the pickup coil 53 against the left inner surface of the compartment 52.

Figure 8:
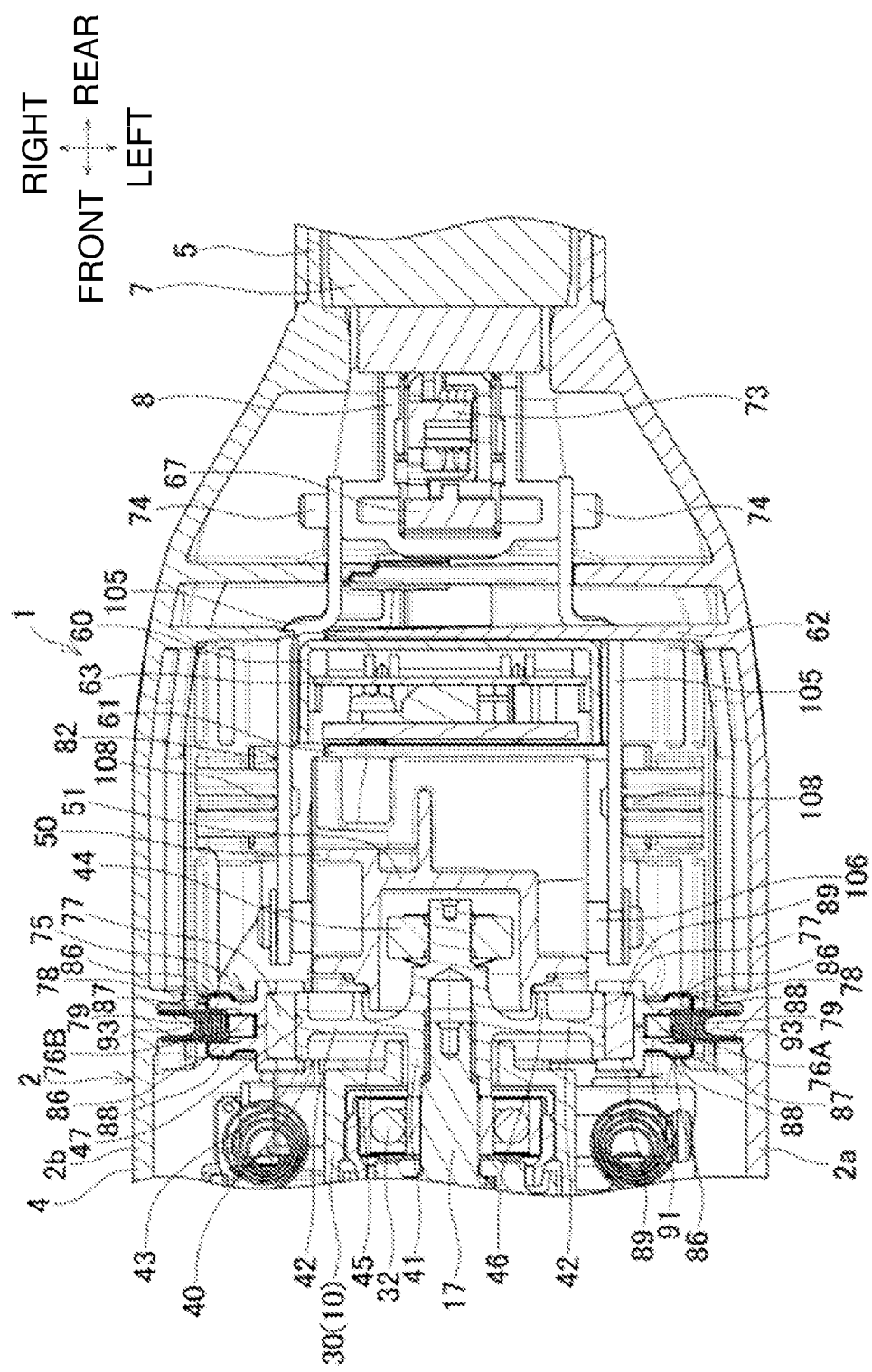
FIG. 8 is a sectional view taken along line B-B in FIG. 3.
Figure 9:
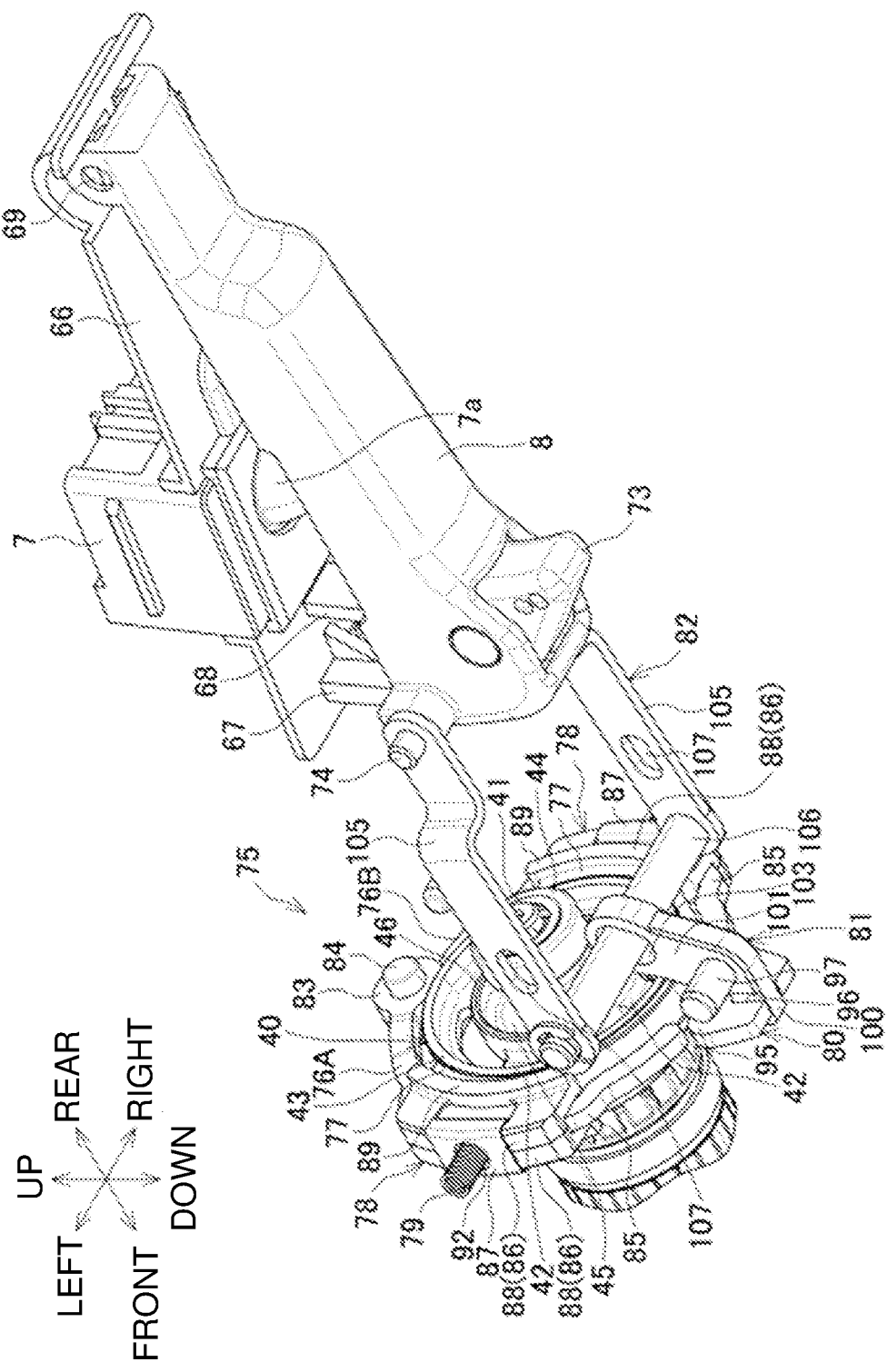
FIG. 9 is a perspective view of the brake assembly alone as viewed from below.

A controller 60 is located behind the coil holder 50 in the body 4. The controller 60 is held vertically at the middle in the lateral direction on a lower receiving rib 61 and a rear receiving rib 62, as also shown in FIG. 8. The lower receiving rib 61 and the rear receiving rib 62 protrude from the inner surface of the left housing half 2a. The controller 60 includes a control circuit board 63 inside. An adjustment dial 64 is located on an upper front surface of the control circuit board 63. An upper portion of the adjustment dial 64 is exposed above the main housing 2 as shown in FIGS. 1 to 3. The rotational speed of the motor 16 can be adjusted by rotating the adjustment dial 64.

The switch 7 is held in an upper portion of the grip 5 with a button 7a facing downward. Holding ribs 65 are located on the inner surfaces of the left and right housing halves 2a and 2b. The holding ribs 65 hold an upper portion of the switch 7. A switch base 66 is held in the grip 5. The switch base 66 holds a lower portion of the switch 7. The switch base 66 is a plate extending in the front-rear direction along the slope of the grip 5. The button 7a protrudes downward through the switch base 66. A stopper tab 67 and an engagement tab 68 are aligned in the front-rear direction in a front portion of the switch base 66. The stopper tab 67 and the engagement tab 68 extend downward. A shaft 69 protrudes leftward and rightward on a lower rear surface of the switch base 66.

The switch lever 8 extends in the front-rear direction under the switch base 66. The switch lever 8 has its rear end connected to the shaft 69 in the switch base 66 in a rotatable manner. The switch lever 8 has a front portion exposed downward through an opening 70. The opening 70 is located in the lower surface of the grip 5. The switch lever 8 includes a pressing portion 71 below the button 7a. The switch lever 8 has an engagement hole 8a in its front surface as shown in FIGS. 3 and 6. The engagement hole 8a receives the lower end of the stopper tab 67.

The switch lever 8 is swingable vertically between an upper position and a lower position. At the upper position of the switch lever 8, the lower edge of the engagement hole 8a comes in contact with the lower end of the stopper tab 67 to cause the pressing portion 71 to press the button 7a. This turns on the switch 7. At the lower position of the switch lever 8, the upper edge of the engagement hole 8a is engaged with the lower end of the stopper tab 67 to cause the pressing portion 71 to separate from the button 7a. This turns off the switch 7.

A coil spring 72 is held between the switch base 66 and the switch lever 8. The coil spring 72 urges the switch lever 8 to the lower position in a normal state. The switch lever 8 includes a lock-on lever 73 at its lower front end. At the upper position or the switch lever 8, the lock-on lever 73 is rotated to be engaged with the engagement tab 68. The lock-on lever 73 thus locks the switch lever 8 at the upper position. A pair of connecting pins 74 protrude from the left and right front side surfaces of the switch lever 8. The connecting pins 74 extend outward in the lateral direction.

The body 4 accommodates a brake assembly 75. The brake assembly 75 includes, as shown in FIGS. 6, 8, 9, and 10, the brake drum 40, a pair of brake arms 76A and 76B, a pair of brake shoes 77, a pair of shoe holders 78, a pair of coil springs 79, a wedge plate 80, a front link 81, and a rear link 82.

Figure 11:
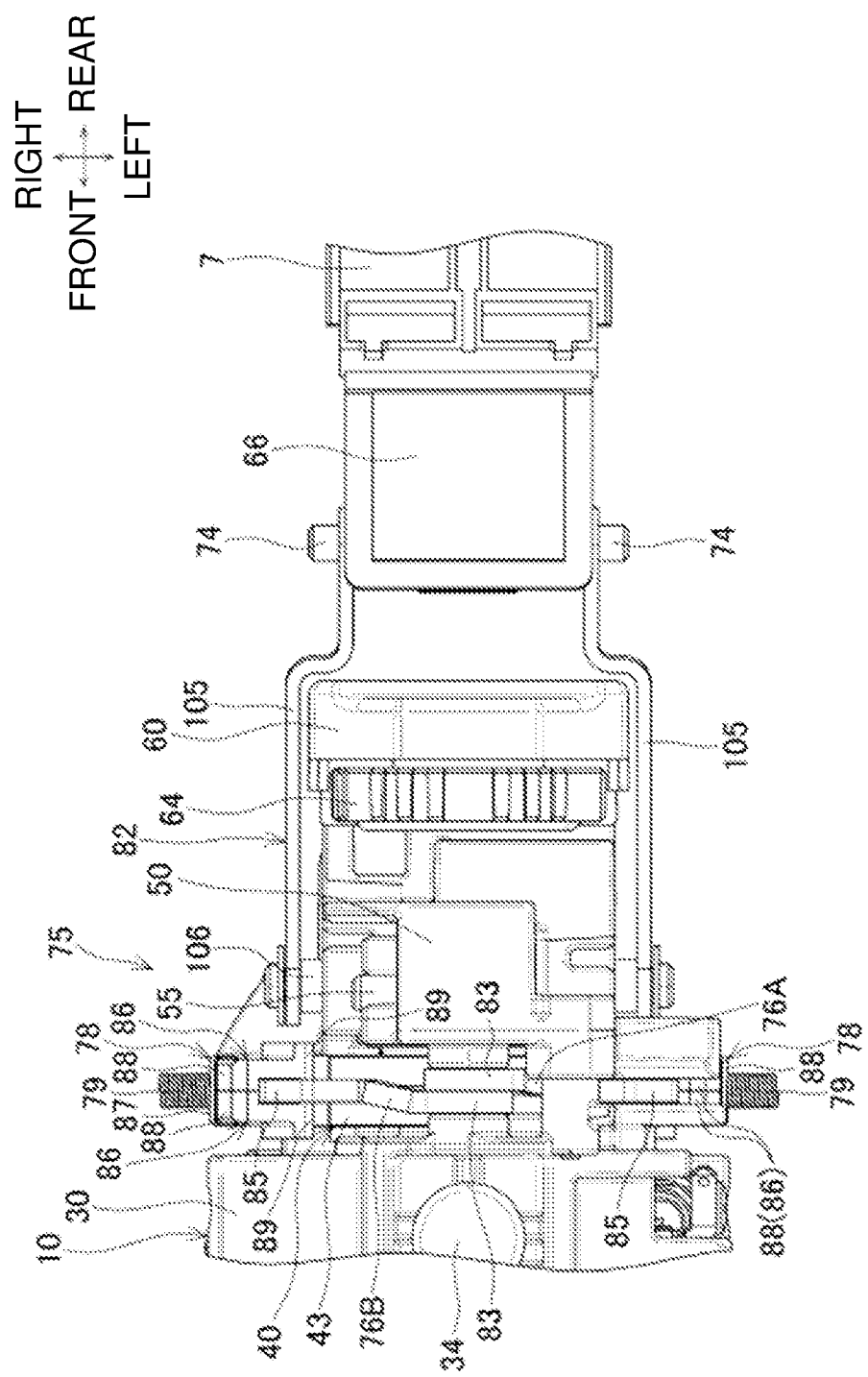
FIG. 11 is a plan view of the brake assembly without showing a main housing.

The brake arms 76A and 76B are located radially outward from the brake drum 40. The brake arms 76A and 76B are semicircular as viewed from the front. The brake arms 76A and 76B are symmetric about the output shaft 17. As shown in FIG. 11, the left brake arm 76A has an upper portion bending to the rear. The right brake arm 76B has an upper portion bending to the front. The left and right brake arms 76A and 76B are located on the same plane perpendicular to the axis of the brake drum 40, except their upper portions.

The brake arms 76A and 76B each have a pivot portion 83 as a ring at the upper end. The pivot portions 83 axially overlap each other in the front-rear direction. The pivot portions 83 aligned in the front-rear direction receive a pivot pin 84 extending in the front-rear direction. As shown in FIG. 3, the pivot pin 84 has a front end supported on the rear surface of the bearing retainer 30. The pivot pin 84 has a rear end supported on the front surface of the coil holder 50. The brake arms 76A and 76B are thus supported in a manner rotatable leftward and rightward about the pivot pin 84. The brake arms 76A and 76B each have a raised portion 85 at the middle in the circumferential direction. Each raised portion 85 raises outward to the left or to the right in an arc. The lower ends of the brake arms 76A and 76B are semicircular as viewed from the front.

The brake shoes 77 are located radially inward from the raised portions 85. Each brake shoe 77 is a strip plate with a greater width than the brake arm 76A or 76B in the front-rear direction. Each brake shoe 77 is an arc along the outer circumference surface of the rim 43 on the brake drum 40.

The shoe holders 78 are located on the raised portions 85. Each shoe holder 78 includes a pair of front and rear clamping plates 86 and a clip 87. Each clamping plate 86 includes an outer peripheral portion 88 and an inner peripheral portion 89. The outer peripheral portions 88 hold the raised portion 85 from the front and rear. The inner peripheral portions 89 hold, inward from the raised portion 85, the outer periphery of the brake shoe 77 from the front and rear. The outer peripheral portions 88 each have an engagement recess 90 for receiving the clip 87 on the outer front surface or on the outer rear surface.

The clip 87 is a plate spring in conformance with the outer shape of the outer peripheral portion 88 having the engagement recess 90. With the clamping plates 86 holding the raised portion 85 and the brake shoe 77 from the front and rear, two ends of the clip 87 are engaged with the engagement recesses 90 to hold the clamping plate 86 from outside. The shoe holder 78 is then fastened to the raised portion 85 while holding the brake shoe 77. The clamping plate 86 has a blind hole 91 that is open radially outward at the joint between the outer peripheral portions 88. The clip 87 has a through-hole 92. The through-hole 92 is located radially outward from the blind hole 91 and is coaxial with the blind hole 91.

Each coil spring 79 is located radially outward from the corresponding shoe holder 78. The coil spring 79 has an inner end placed in the blind hole 91 in the clamping plate 86 through the through-hole 92 in the clip 87. The coil spring 79 has an outer end externally mounted on a receiving projection 93 protruding from the inner surface of the housing half 2a or 2b.

Figure 10:
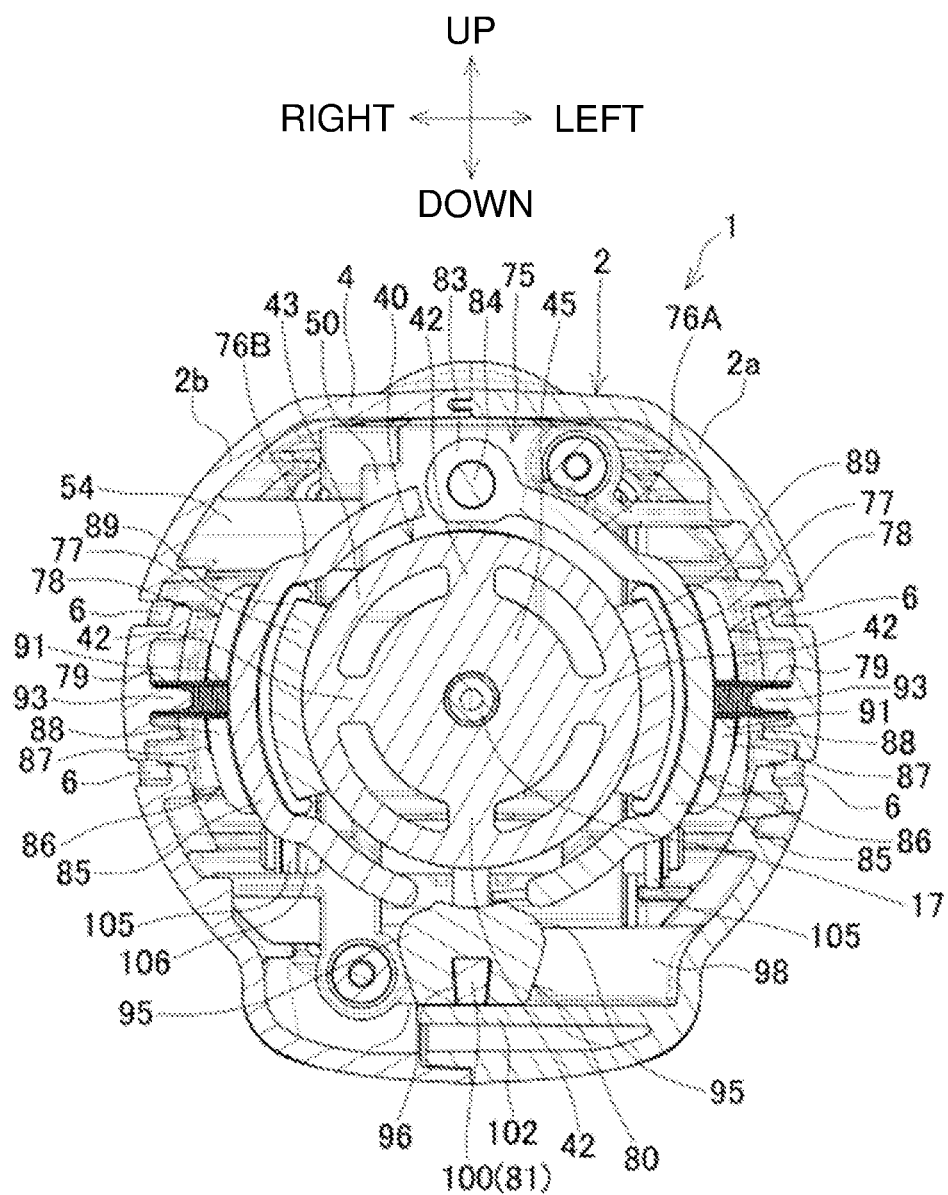
FIG. 10 is a sectional view taken along line C-C in FIG. 3.

The left and right brake arms 76A and 76B are thus urged radially inward by the coil springs 79 in a normal state. This reduces the distance between the brake arms 76A and 76B. The brake shoes 77 held on the brake arms 76A and 76B with the shoe holders 78 press the outer circumference surface of the rim 43 on the brake drum 40 from the left and right simultaneously, as shown in FIG. 10.

The wedge plate 80 is located below the brake drum 40 and at the middle in the lateral direction. The wedge plate 80 is a symmetrical plate including left and right extensions 95. The left and right extensions 95 extend semicircularly to the upper left and the upper right of the wedge plate 80. The extensions 95 are located below the lower ends of the brake arms 76A and 76B. As shown in FIG. 3, the rear surface of the bearing retainer 30 is close to or in contact with the front surface of the wedge plate 80 and the front surface of the coil holder 50 is close to or in contact with the rear surface of the wedge plate 80. The wedge plate 80 is thus restricted from moving back and forth between the bearing retainer 30 and the coil holder 50. The wedge plate 80 has a connection groove 96 at its lower middle in the lateral direction. The connection groove 96 extends through the wedge plate 80 in the front-rear direction and is open downward. The connection groove 96 has a width decreasing from its upper end, which defines the bottom of the connection groove 96, toward its lower end.

Figure 12:
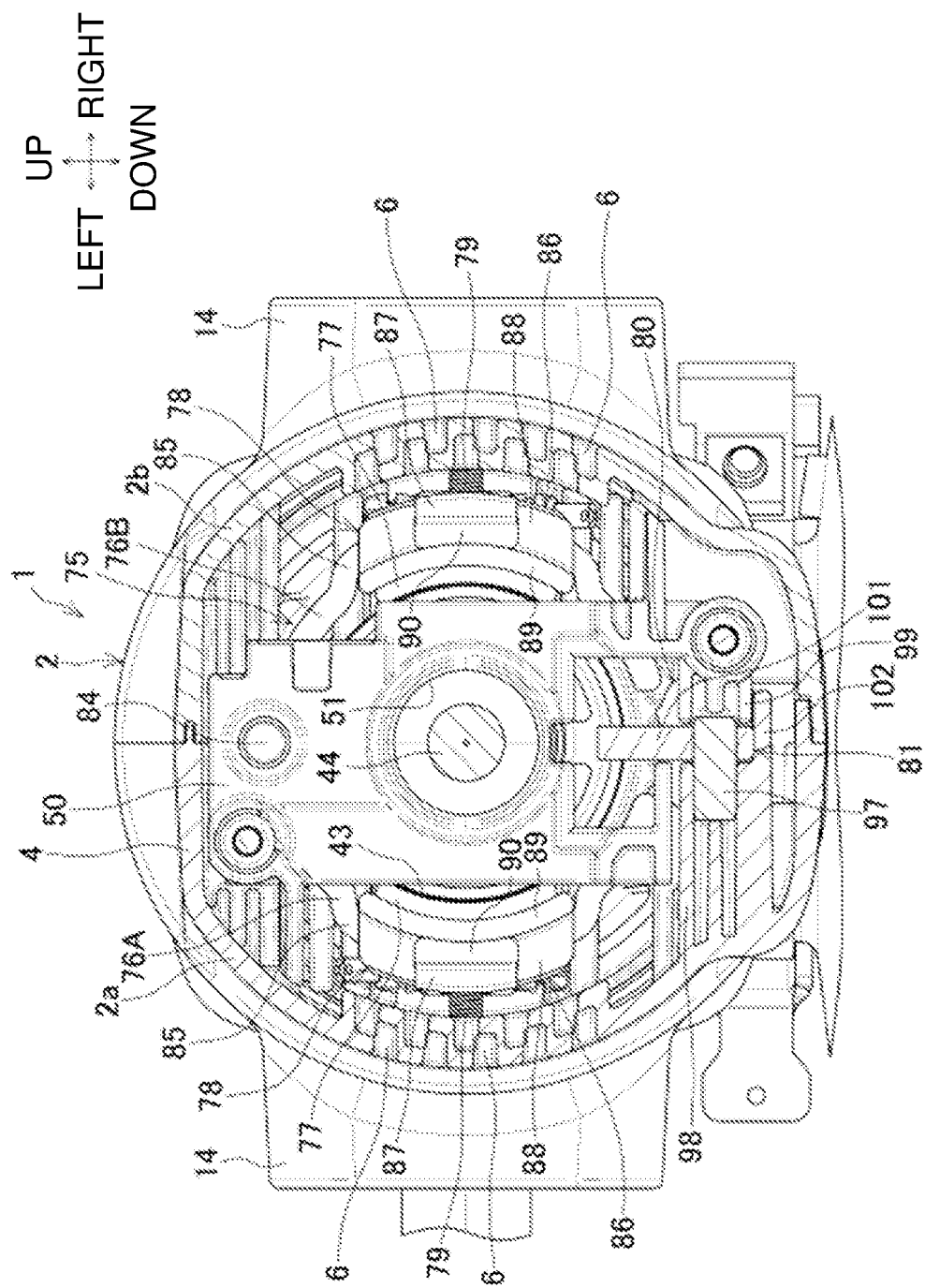
FIG. 12 is a sectional view taken along line D-D in FIG. 3.

The front link 81 is located below the magnet sleeve 44 and the brake drum 40 and at the middle in the lateral direction. The front link 81 is a strip plate bent into an L shape as viewed laterally. The front link 81 is located vertically below the circular recess 51 in the coil holder 50. A support pin 97 extends through a bend of the front link 81 in the lateral direction. The support pin 97 is supported by a receiving boss 98 protruding from the inner surface of the left housing half 2a as shown in FIG. 12. A pin receiver 99 is located in a lower portion of the coil holder 50 rightward from the front link 81. The pin receiver 99 positions the right end of the support pin 97.

The front link 81 is thus supported about the support pin 97 in a rotatable manner in the main housing 2.

The front link 81 includes a front arm 100 and a rear arm 101. The front arm 100 protrudes frontward from the support pin 97 and is placed in the connection groove 96 in the wedge plate 80. The rear arm 101 extends diagonally from the support pin 97 to the upper rear. As shown in FIG. 10, the front arm 100 is tapered, as is the connection groove 96, with the lateral width decreasing from its upper end toward its lower end in the cross section. With the front arm 100 fitted in the connection groove 96, the wedge plate 80 is connected to the front arm 100 while being prevented from slipping off upward, and moves up and down together with the front arm 100. Each receiving boss 98 includes a restrictor 102. The restrictor 102 restricts downward rotation of the front arm 100. As shown in FIGS. 3 and 10, the wedge plate 80 is at a lower limit position at the rotational position of the front link 81 at which the front arm 100 is in contact with the restrictor 102, or in other words, at a left rotational position of the front link 81 about the support pin 97 in FIG. 3. At the lower limit position, the wedge plate 80 is away downward from the left and right lower ends of the brake arms 76A and 76B. The rear arm 101 has an elongated hole 103 elongated in the longitudinal direction at its upper end.

Figure 13:
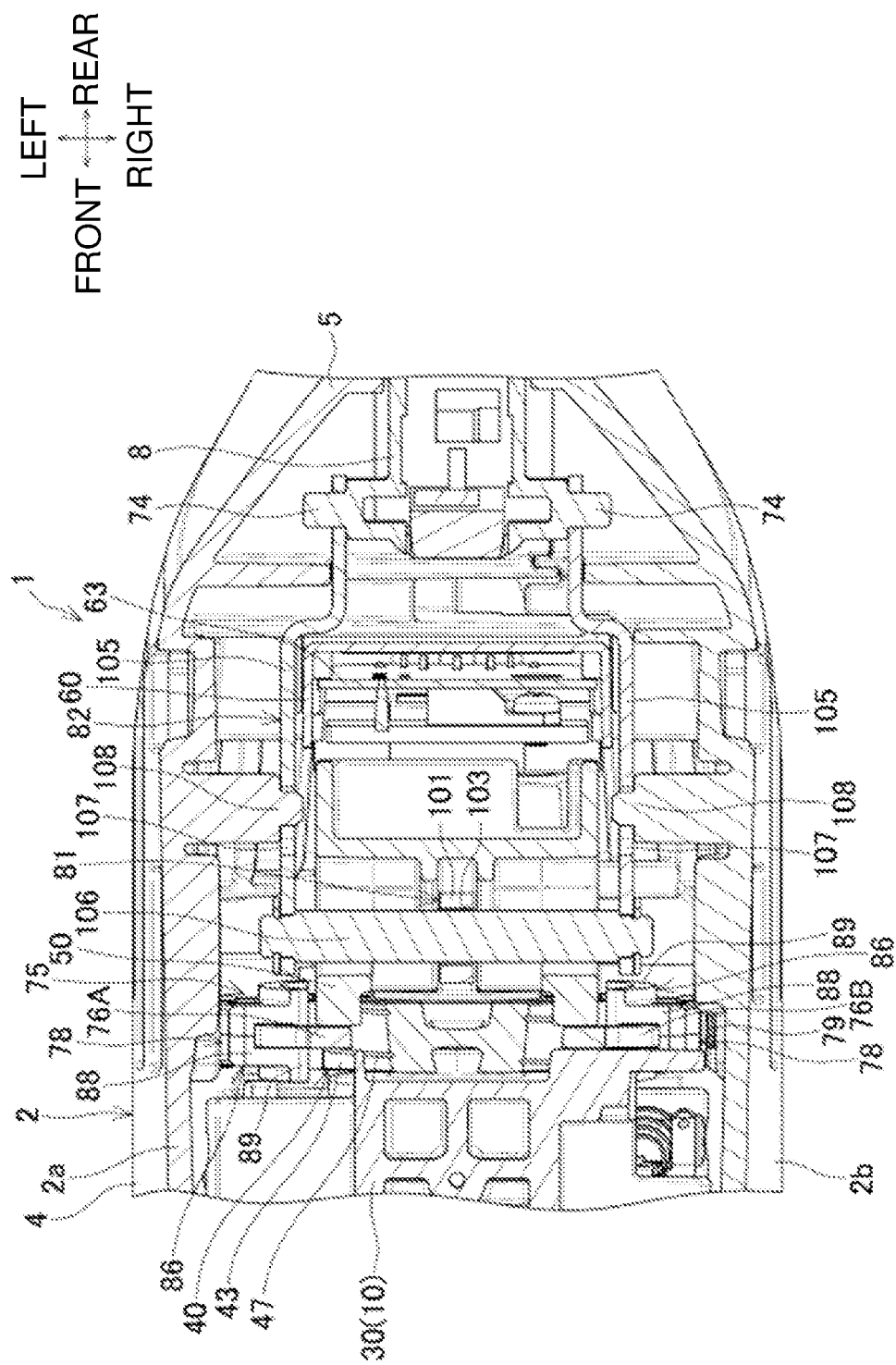
FIG. 13 is a sectional view taken along line E-E in FIG. 3.

The rear link 82 includes a pair of left and right arms 105 and a connecting shaft 106. The arms 105 are located on the left and right of the coil holder 50 and the controller 60. Each arm 105 extends in the front-rear direction. Each arm 105 has a rear portion bent toward the middle in the lateral direction to protrude into the grip 5 to have a shorter distance between the left and right arms 105. The arm 105 has its rear end connected to the connecting pin 74 in the switch lever 8 in a rotatable manner. The arm 105 has a pivot hole 107 elongated in the longitudinal direction at the middle. As shown in FIG. 13, support bosses 108 protrude from the inner surfaces of the left and right housing halves 2a and 2b. Each support boss 108 has a distal end engaged with the corresponding pivot hole 107.

The connecting shaft 106 located in the lateral direction extends through the elongated hole 103 in the rear arm 101. The connecting shaft 106 has its left and right ends connected to the front ends of the arms 105 in a rotatable manner.

Figure 14:
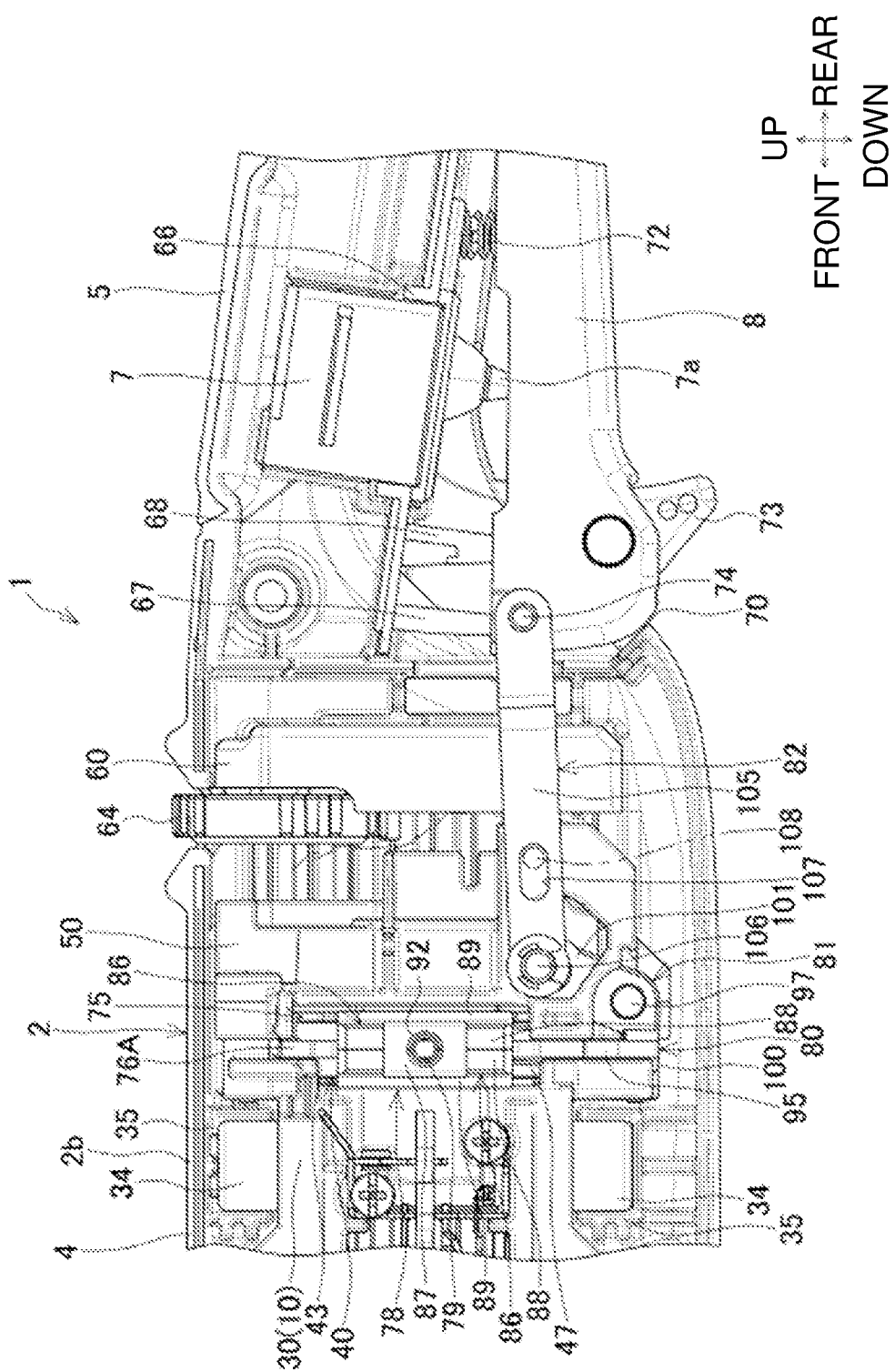
FIG. 14 is a side view of the brake assembly without showing the left housing half in the switch-off state.

At the lower position of the switch lever 8, each arm 105 has a substantially horizontal posture with the support boss 108 located rearward in the pivot hole 107 as shown in FIG. 14. The connecting shaft 106 is at a forward position and the front link 81 is at the left rotational position. The wedge plate 80 is thus at the lower limit position below the brake arms 76A and 76B.

Figure 15:
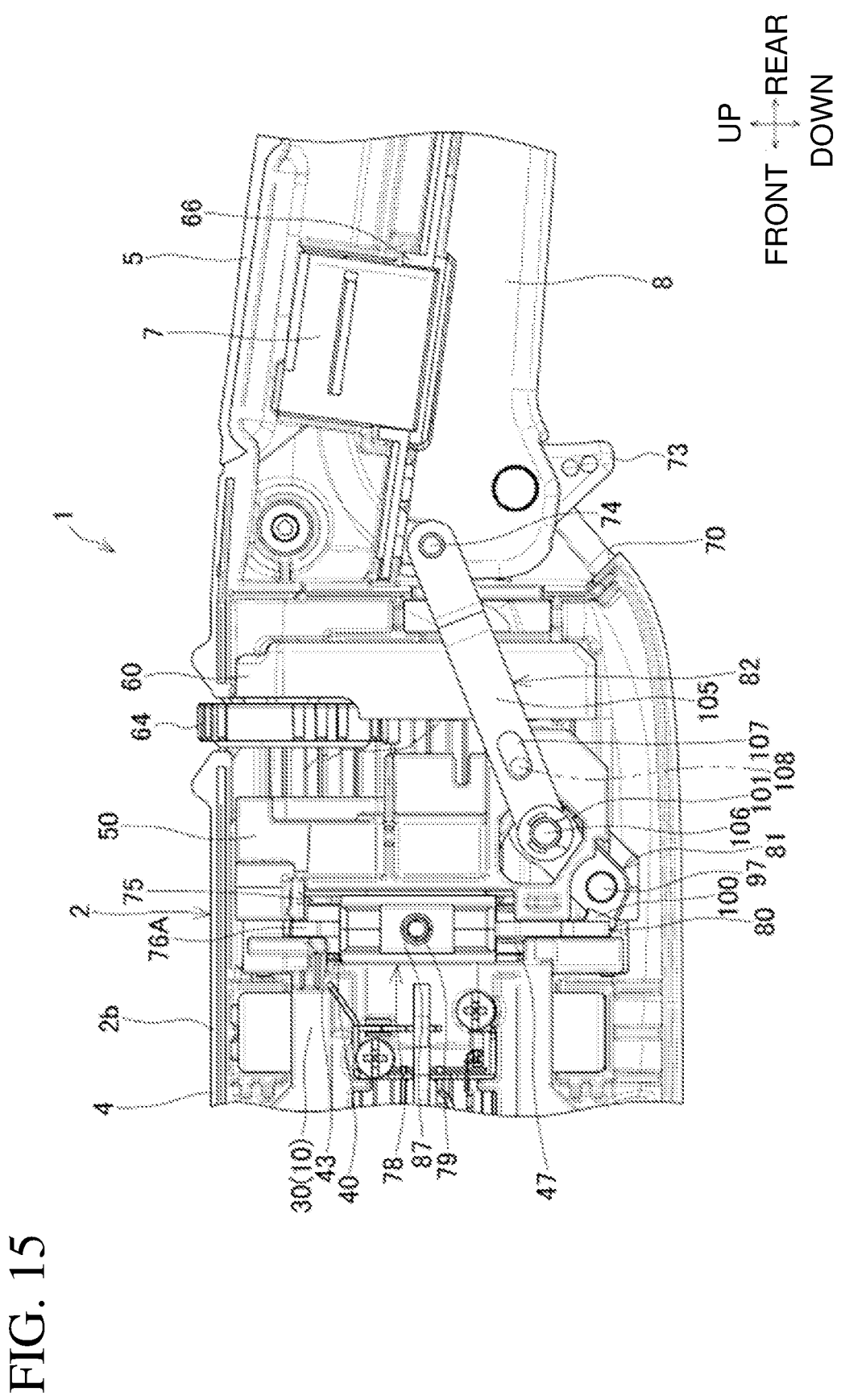
FIG. 15 is a side view of the brake assembly without showing the left housing half in a switch-on state.
Figure 16:
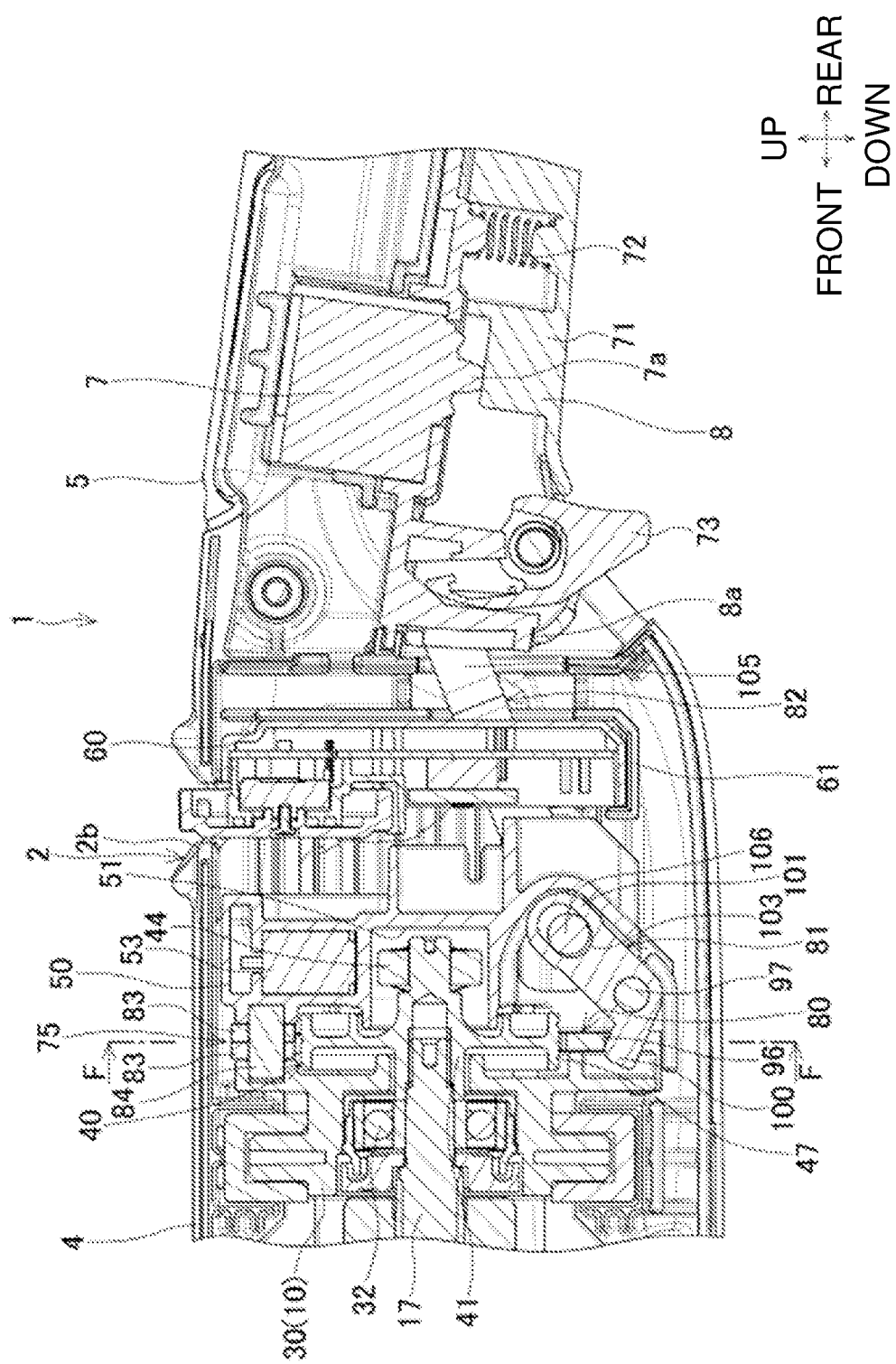
FIG. 16 is an enlarged view of the brake assembly corresponding to FIG. 3 in the switch-on state.

In response to the switch lever 8 swinging to the upper position, the connecting pin 74 moves upward. As shown in FIG. 15, the arm 105 then rotates to the left substantially about the support boss 108 with its rear end moving upward together with the connecting pin 74, causing the support boss 108 to move relatively within the pivot hole 107. The front end of the arm 105 thus moves downward together with the connecting shaft 106 while moving backward. The front link 81 then rotates to the right about the support pin 97 and lift the front arm 100 as shown in FIG. 16. The wedge plate 80 is thus at the upper limit position at which the wedge plate 80 is placed between the lower ends of the brake arms 76A and 76B.

In the brake assembly 75 with the switch 7 being off in the grinder 1 according to the present embodiment, the brake shoes 77 press, in the lateral direction, the outer circumference surface of the rim 43 on the brake drum 40, which rotates together with the output shaft 17. Braking is thus applied to the output shaft 17 through the brake drum 40.

The switch lever 8 is then pressed with the hand holding the grip 5. Then, as shown in FIGS. 15 and 16, the switch lever 8 swings to the upper position to press the button 7a, turning on the switch 7. The controller 60 then energizes the motor 16.

Figure 17:
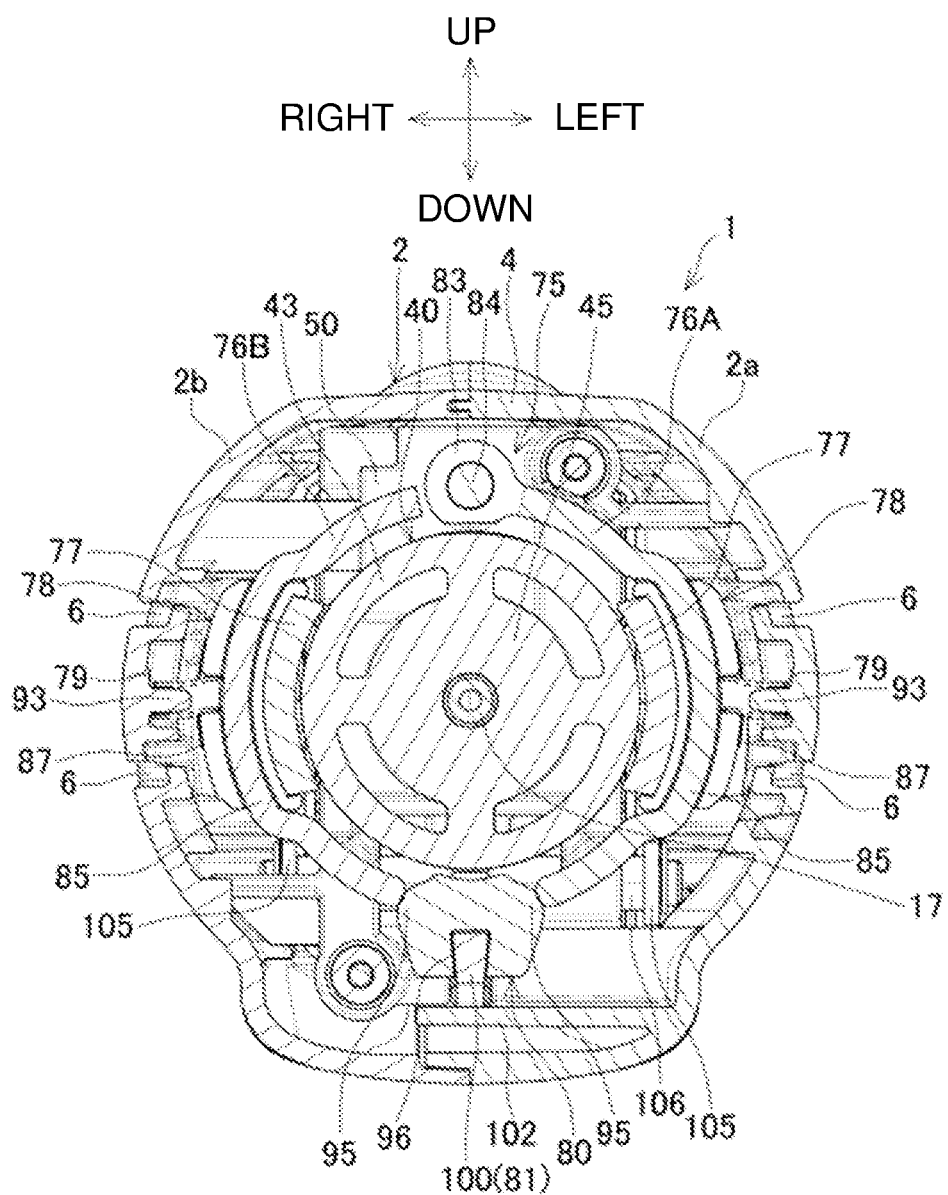
FIG. 17 is a sectional view taken along line F-F in FIG. 16.

In response to the switch lever 8 swinging to the upper position, the arm 105 in the rear link 82 rotates to the left to rotate the front link 81 to the right, moving the wedge plate 80 to the upper position. As shown in FIG. 17, the brake arms 76A and 76B then rotate outward to the left and right about the pivot pin 84 to separate the brake shoes 77 from the rim 43 on the brake drum 40. The output shaft 17 is released from braking and rotates. The rotation of the output shaft 17 is transmitted to the spindle 23 through the bevel gears 21 and 24, thus rotating the tip tool 28.

The fan 19 rotates as the output shaft 17 rotates. This causes outside air to be sucked in through the inlets 6 in the body 4. The sucked air passes through the controller 60 and the coil holder 50 in this order. The air then flows between the spokes 42 in the brake drum 40 and through radially outside the rim 43 to the motor 16. The air then passes through the motor 16 and flows through the gear housing cover 12 to be discharged through the outlets 20. This air flow cools the controller 60, the coil holder 50, the brake drum 40, and the motor 16.

In particular, heat is dissipated from the entire rim 43 on the brake drum 40. The airflow in contact with the brake drum 40 thus effectively cools the brake drum 40. Although dust or other matter can be produced from the brake shoes 77, such dust may be blown forward by the airflow and is less likely to adhere to the outer circumferential surface of the rim 43. Dust or other matter in the groove 47 is discharged forward or backward along the groove 47 as the brake drum 40 rotates.

In response to the switch lever 8 released from being pressed, the coil spring 72 urges the switch lever 8 to swing to the lower position. The button 7a is thus released from being pressed to turn off the switch 7.

As the switch lever 8 swings to the lower position, the rear link 82 moves forward to the position shown in FIGS. 3 and 14 while rotating to the right substantially about the support boss 108. The front link 81 then rotates to the left about the support pin 97 and swings the front arm 100 downward. The wedge plate 80 thus moves to the lower limit position in FIG. 10 to be removed from between the lower ends of the brake arms 76A and 76B. The brake arms 76A and 76B then rotate toward the middle in the lateral direction under an urging force from the coil springs 79, causing the brake shoes 77 to press the outer circumference surface of the rim 43 on the brake drum 40. Thus, braking is applied to the output shaft 17 through the brake drum 40, and the braking force is transmitted to the spindle 23 to stop the tip tool 28.

During braking, the brake shoes 77 press the rim 43 with a larger diameter than the output shaft 17 from radially outward positions. In other words, braking is applied to the output shaft 17 indirectly from positions radially away from the axis of the output shaft 17. A higher braking force can be applied with a lower pressing force. The groove 47 reduces dust or other matter accumulating on the outer circumferential surface of the rim 43. The braking force is thus efficiently transmitted from the brake shoes 77 to the rim 43, without the braking performance being affected.

As described above, the grinder 1 according to the present embodiment includes the main housing 2 (housing), the switch lever 8 (operable member), the switch 7 located in the main housing 2 and operable to be turned on or off in response to an operation on the switch lever 8, the output shaft 17 (rotational shaft) located in the main housing 2 and rotatable in response to an operation for turning on the switch 7, and the brake assembly 75 located in the main housing 2 to apply braking to the output shaft 17 with the switch 7 being in an off state and to release the braking applied to the output shaft 17 in response to an operation for turning on the switch 7 performed by the switch lever 8.

The circular brake drum 40 (brake member) is fixed to the output shaft 17. The brake shoes 77 (pressing members) press the brake drum 40 at two positions to apply a uniform force to the brake drum 40 from radially outward positions toward the center. The brake assembly 75 thus applies braking to the output shaft 17.

This structure easily directs cooling air to the sliding surfaces between the rim 43 on the brake drum 40 and the brake shoes 77. Heat generated during braking is thus reduced, preventing reduction in braking performance or the service life of the components.

The pair of brake shoes 77 are point-symmetric to each other about the center of the brake drum 40.

This allows a uniform force to be easily applied to the brake drum 40 from radially outward positions toward the center.

The rim 43 on the brake drum 40 has, on its outer circumferential surface, the spiral groove 47 being open to the front end face and the rear end face of the brake drum 40 in the axial direction of the output shaft 17.

This effectively discharges foreign matter such as dust. Any foreign matter is thus less likely to remain on the sliding surfaces between the rim 43 and the brake shoes 77, more effectively preventing reduction in braking performance.

The brake assembly 75 includes the pair brake arms 76A and 76B (holding members) holding the brake shoes 77. The pair of brake arms 76A and 76B are operable to be open or closed about the pivot pin 84 (pivot) set radially outward from the brake drum 40 to cause the brake shoes 77 to be in contact with or separate from the outer circumference surface of the brake drum 40.

This allows the brake shoes 77 to press the brake drum 40 from the radially outward positions in a balanced manner with a compact structure.

The brake arms 76A and 76B each include the pair of clamping plates 86 (retaining members) clamping the brake shoe 77 together with the raised portion 85, and the clip 87 holding and fixing the pair of clamping plates 86 with the raised portion 85 and the brake shoe 77 in a clamped state.

The brake shoes 77 can be easily and reliably joined to the brake arms 76A and 76B. The brake shoes 77 can also be replaced easily.

The brake arms 76A and 76B are semicircular and are located outward from the brake drum 40 to extend radially. The brake assembly 75 further includes the wedge plate 80 (wedge member) located opposite to the pivot pin 84 across the brake drum 40 to be placed between or removed from between the ends of the brake arms 76A and 76B to open or close the brake arms 76A and 76B.

This easily allows synchronous opening or closing of the brake arms 76A and 76B.

The brake assembly 75 includes the front link 81 and the rear link 82 (link member) that cause the wedge plate 80 to be placed between or removed from between the ends of the brake arms 76A and 76B in response to an operation on the switch lever 8. The wedge plate 80 is connectable with the front link 81 by fitting.

This easily connects the wedge plate 80 to the front link 81 to allow smooth vertical movement of the wedge plate 80 in accordance with rotation of the front link 81.

The link member includes the rear link 82 (first link member) operable in cooperation with the switch lever 8, and the front link 81 (second link member) connected to the rear link 82 in a rotatable manner and operable in cooperation with the wedge plate 80.

This structure allows the wedge plate 80 to be placed or removed smoothly in response to an operation on the switch lever 8, although the switch lever 8 and the wedge plate 80 are located apart from each other in the front-rear direction.

The rear link 82 includes the pair of arms 105.

This allows the controller 60 or other components to be located between the switch lever 8 and the wedge plate 80 by using the space between the arms 105 without interfering with the operation of the brake assembly 75.

The brake arms 76A and 76B and the wedge plate 80 are positioned in the axial direction of the output shaft 17 between the motor housing 10 and the coil holder 50 (examples of two components) arranged in the axial direction in the main housing 2.

The brake arms 76A and 76B and the wedge plate 80 can thus be easily positioned in a space-saving manner using the space between the motor housing 10 and the coil holder 50.

The brake drum 40 is fastened to the output shaft 17 by screwing.

This allows the brake drum 40 to be easily fastened to the output shaft 17.

Modifications of the present disclosure will now be described.

The brake member may have a shape modified as appropriate. For example, more or fewer spokes may be used, or the hub or the rim may have any other shape. The brake member is not limited to the brake drum in the present embodiment, but may be a single disk. Multiple grooves may be located on the outer circumferential surface or the groove may be eliminated. The brake member may be fastened to the output shaft in any manner other than by screwing.

The holding member is not limited to the brake arm in the present embodiment, but may be modified as appropriate. For example, the brake arm may be bent along the outer circumference of the brake member, instead of being semicircular as viewed from the front. The pair of holding members may each have a pivot below or lateral to the drum brake, instead of being above the brake drum.

The brake arms may not be urged using the coil springs located on the left and right of the brake arms. For example, a tension spring between the brake arms may urge the brake arms.

Instead of two brake shoes, three or more brake shoes may be arranged in the circumferential direction of the brake member to be in contact with or separate from the brake member from radially outward positions. The brake shoes may not be held by the shoe holders in the present embodiment. For example, the retaining member may hold the brake shoes using, for example, a pair of clamping plates hinged together, or clamping plates engaged with each other without the clip. The brake shoes may be attached directly to the brake arms with an adhesive without using the shoe holders. The brake shoes may also have any other structure modified as appropriate.

The wedge member may not be the wedge plate in the present embodiment. For example, the wedge member may be tapered (trapezoidal or triangular) with a lateral width decreasing upward, instead of including the semicircular left and right pressing portions. The wedge member may be connected to the front link with, for example, a pin, instead of a tapered connection groove.

The wedge member may be a block (e.g., cone) instead of a plate. The wedge member may be placed between or removed between from the holding members in the front-rear direction, instead of being in the radial direction.

The holding members and the wedge member may be positioned in the front-rear direction without using the motor housing and the coil holder, unlike in the present embodiment. Other components in the main housing may be used to position the holding members and the wedge member. The holding members and the wedge member may be positioned without using components but using, for example, ribs protruding into the housing.

The link members may have any structure other than the front link and the rear link in the present embodiment. For example, the front arm in the front link may be integral with a portion corresponding to the wedge member. The front link may include a pair of arms. The rear link may not include a pair of arms when the structure does not include the component such as a controller.

Three or more link members may be used.

Instead of an alternating current (AC) tool using utility power, the power tool may be a direct current (DC) tool powered by a battery pack.

The power tool may be a device other than a grinder. The present disclosure is applicable to any tool that includes a brake assembly applying braking to a rotational shaft that rotates a tip tool, for example, a grinding tool or a polishing tool (e.g., a polisher or a sander), or a cutting tool (e.g., a circular saw or a cutter). The brake assembly may be used to apply braking to a rotational shaft other than an output shaft in a motor.

The power tool is not limited to an electric tool. The present disclosure is also applicable to an air tool or an engine tool.

REFERENCE SIGNS LIST 1 grinder
2 main housing
3 gear housing
4 body
5 grip
7 switch
8 switch lever
10 motor housing
16 motor
17 output shaft
19 fan
23 spindle
28 tip tool
30 bearing retainer
40 brake drum
41 hub
43 rim
47 groove
50 coil holder
60 controller
74 connecting pin
75 brake assembly
76A, 76B brake arm
77 brake shoe
78 shoe holder
79 coil spring
80 wedge plate
81 front link
82 rear link
83 pivot portion
84 pivot pin
85 raised portion
86 clamping plate
87 clip
95 extension
96 connection groove
97 support pin
100 front arm
101 rear arm
105 arm
106 connecting shaft

What is claimed is:

1. A power tool, comprising:
  a housing;
  an operable member;
  a switch located in the housing and operable to be turned on or off in response to an operation on the operable member;
  a rotational shaft located in the housing and rotatable in response to an operation for turning on the switch, the rotational shaft rotating about an axis; and
  a brake assembly located in the housing, the brake assembly being configured to apply braking to the rotational shaft with the switch being in an off state and to release the braking applied to the rotational shaft in response to an operation for turning on the switch performed by the operable member, the brake assembly including
    a brake member being circular and fixed to the rotational shaft, and
    a plurality of pressing members configured to press the brake member at a plurality of positions to apply a uniform force to the brake member, the uniform force passing in a radial direction of the axis from radially outward positions through the axis,
  wherein
    the brake member has, on an outer circumferential surface, a spiral groove extending from a front end face toward a rear end face of the brake member in an axial direction of the rotational shaft.

2. The power tool according to claim 1, wherein
the plurality of pressing members are a pair of pressing members, and the pair of pressing members are point-symmetric to each other about the center of the brake member.

3. The power tool according to claim 2, wherein
the brake assembly includes a pair of holding members holding the pair of pressing members of the plurality of pressing members, and
the pair of holding members are operable to be both open and closed about a pivot set radially outward from the brake member to cause the pair of pressing members to be in contact with and separate from an outer circumference surface of the brake member.

4. The power tool according to claim 2, wherein
the brake member is fastened to the rotational shaft by screwing.

5. The power tool according to claim 1, wherein
the brake member is fastened to the rotational shaft by screwing.

6. A power tool, comprising:
  a housing;
  an operable member;
  a switch located in the housing and operable to be turned on or off in response to an operation on the operable member;
  a rotational shaft located in the housing and rotatable in response to an operation for turning on the switch, the rotational shaft rotating about an axis; and
  a brake assembly located in the housing, the brake assembly being configured to apply braking to the rotational shaft with the switch being in an off state and to release the braking applied to the rotational shaft in response to an operation for turning on the switch performed by the operable member, the brake assembly including
    a brake member being circular and fixed to the rotational shaft, and
    a plurality of pressing members configured to press the brake member at a plurality of positions to apply a uniform force to the brake member, the uniform force passing in a radial direction of the axis from radially outward positions through the axis, wherein the brake assembly includes a pair of holding members holding a pair of pressing members of the plurality of pressing members, and the pair of holding members are operable to be both open and closed about a pivot set radially outward from the brake member to cause the pair of pressing members to be in contact with and separate from an outer circumference surface of the brake member.

7. The power tool according to claim 6, wherein each of the pair of holding members includes a pair of retaining members clamping a corresponding pressing member of the pair of pressing members together with the holding member, and a clip holding and fixing the pair of retaining members with the holding member and the corresponding pressing member in a clamped state.

8. The power tool according to claim 7, wherein each of the pair of holding members is semicircular and is located outward from the brake member to extend radially, and the brake assembly further includes a wedge member located opposite to the pivot across the brake member, and the wedge member is to be placed between or removed from between ends of the pair of holding members to open or close the pair of holding members.

9. The power tool according to claim 6, wherein each of the pair of holding members is semicircular and is located outward from the brake member to extend radially, and the brake assembly further includes a wedge member located opposite to the pivot across the brake member, and the wedge member is to be placed between or removed from between ends of the pair of holding members to open or close the pair of holding members.

10. The power tool according to claim 9, wherein the pair of holding members and the wedge member are positioned in an axial direction of the rotational shaft between two components arranged in the axial direction in the housing.

11. The power tool according to claim 9, wherein the brake assembly further includes a link member configured to cause the wedge member to be placed between or removed from between the ends of the pair of holding members in response to an operation on the operable member, and the wedge member is connectable with the link member by fitting.

12. The power tool according to claim 11, wherein the pair of holding members and the wedge member are positioned in an axial direction of the rotational shaft between two components arranged in the axial direction in the housing.

13. The power tool according to claim 11, wherein the link member includes a first link member operable in cooperation with the operable member, and a second link member connected to the first link member in a rotatable manner and operable in cooperation with the wedge member.

14. The power tool according to claim 13, wherein the pair of holding members and the wedge member are positioned in an axial direction of the rotational shaft between two components arranged in the axial direction in the housing.

15. The power tool according to claim 13, wherein at least the first link member includes a pair of arms.

16. The power tool according to claim 15, wherein the pair of holding members and the wedge member are positioned in an axial direction of the rotational shaft between two components arranged in the axial direction in the housing.

17. The power tool according to claim 6, wherein the brake member is fastened to the rotational shaft by screwing.

* * * * *